(12) United States Patent
Roberge et al.

(10) Patent No.: US 12,364,205 B2
(45) Date of Patent: Jul. 22, 2025

(54) BALE WRAPPING SYSTEM

(71) Applicant: CNH Industrial America LLC, New Holland, PA (US)

(72) Inventors: Martin J. Roberge, Saskatoon (CA); Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 768 days.

(21) Appl. No.: 17/627,024

(22) PCT Filed: Jul. 16, 2020

(86) PCT No.: PCT/US2020/042331
§ 371 (c)(1),
(2) Date: Jan. 13, 2022

(87) PCT Pub. No.: WO2021/011773
PCT Pub. Date: Jan. 21, 2021

(65) Prior Publication Data
US 2022/0248609 A1  Aug. 11, 2022

Related U.S. Application Data

(60) Provisional application No. 62/874,863, filed on Jul. 16, 2019.

(51) Int. Cl.
*A01F 15/18* (2006.01)
*A01F 15/07* (2006.01)

(52) U.S. Cl.
CPC ......... *A01F 15/0715* (2013.01); *A01F 15/18* (2013.01); *A01F 2015/077* (2013.01); *A01F 2015/183* (2013.01)

(58) Field of Classification Search
CPC ......... B30B 9/30; B30B 9/3003; A01F 15/10; A01F 15/101; A01F 15/102; A01F 15/103; A01F 15/105; A01F 15/106
See application file for complete search history.

(56) References Cited

U.S. PATENT DOCUMENTS

| 3,674,139 A | 7/1972 | Manasian et al. |
| 3,994,116 A | 11/1976 | McCormick |

(Continued)

FOREIGN PATENT DOCUMENTS

| CN | 104244702 | 12/2014 |
| CN | 104813811 | 8/2015 |

(Continued)

OTHER PUBLICATIONS

Chinese Application No. 202080059736.X, First Office Action, dated Jan. 3, 2023, 18 pgs.

(Continued)

*Primary Examiner* — Matthew Katcoff
(74) *Attorney, Agent, or Firm* — Peter K. Zacharias; Rebecca L. Henkel; Rickard K. DeMille

(57) ABSTRACT

A bale wrapping system includes a bale chamber configured to receive agricultural product and a belt configured to be disposed within the bale chamber. The belt is configured to be positioned between a bale wrap and an interior surface of the bale chamber while the belt is disposed within the bale chamber. Additionally, the belt is configured to support the bale wrap and to move into the bale chamber due to a weight of the agricultural product on the bale wrap. Further, the belt is configured to compact the agricultural product within the bale wrap, such that a bale of the agricultural product at least partially surrounded by the bale wrap is formed within the bale chamber.

20 Claims, 13 Drawing Sheets

(56) References Cited

U.S. PATENT DOCUMENTS

| | | | |
|---|---|---|---|
| 4,228,638 A | 10/1980 | Rabe et al. | |
| 4,452,134 A * | 6/1984 | Muse | A01D 46/08 19/65 R |
| 4,803,832 A * | 2/1989 | Crawford | A01F 15/00 100/80 |
| 4,838,016 A | 6/1989 | Frogbrook et al. | |
| 4,841,851 A | 6/1989 | Quataert | |
| 5,215,006 A | 6/1993 | Jennings et al. | |
| 5,553,446 A | 9/1996 | Sibley et al. | |
| 6,032,446 A | 3/2000 | Gola et al. | |
| 6,263,650 B1 | 7/2001 | Deutsch et al. | |
| 6,651,417 B1 | 11/2003 | Lackey | |
| 7,003,933 B2 * | 2/2006 | Fukumori | A01F 15/0715 100/88 |
| 8,776,678 B2 | 7/2014 | Roberge | |
| 9,137,948 B2 | 9/2015 | Meagher et al. | |
| 9,374,945 B2 | 6/2016 | Nes | |
| 9,402,348 B2 * | 8/2016 | Acimas | B65B 13/26 |
| 9,475,598 B2 | 10/2016 | Roberge et al. | |
| 9,750,195 B2 | 9/2017 | Hawes et al. | |
| 9,980,437 B2 | 5/2018 | Smith | |
| 10,058,037 B2 | 8/2018 | Kraus | |
| 10,257,987 B2 * | 4/2019 | Reints | A01D 46/08 |
| 11,744,179 B2 * | 9/2023 | Cracraft | A01F 15/106 701/50 |
| 2004/0250705 A1 | 12/2004 | Underhill | |
| 2009/0223197 A1 | 9/2009 | Kohlbeck | |
| 2013/0145724 A1 | 6/2013 | Roberge et al. | |
| 2013/0160660 A1 | 6/2013 | Roberge | |
| 2013/0240334 A1 | 9/2013 | Moeschen-Siekmann et al. | |
| 2016/0353665 A1 | 12/2016 | Hummel et al. | |
| 2018/0249635 A1 | 9/2018 | Kraus et al. | |

FOREIGN PATENT DOCUMENTS

| | | |
|---|---|---|
| CN | 105246321 | 1/2016 |
| CN | 208813654 | 5/2019 |
| JP | 2004135594 | 5/2004 |
| JP | 2008011804 | 1/2008 |
| KR | 20140063980 | 5/2014 |
| WO | 2013/124836 A1 | 8/2013 |
| WO | 2014144470 | 9/2014 |
| WO | 2014144566 | 9/2014 |
| WO | 2014144691 | 9/2014 |
| WO | 2014151790 | 9/2014 |
| WO | 2021011767 | 1/2021 |
| WO | 2021011770 | 1/2021 |
| WO | 2021011783 | 1/2021 |

OTHER PUBLICATIONS

International Search Report and Written Opinion for PCT Application No. PCT/US2020/042331, mailed Oct. 7, 2020 (14 pages).
Extended European Search Report for EP Application No. 20840943.5 dated Jul. 12, 2023 (four pages).
CN Application No. 202310800446.1 Notification of the First Office Action and translation, May 27, 2025, 19 pgs.

* cited by examiner

BALE WRAPPING SYSTEM

CROSS-REFERENCE TO RELATED APPLICATIONS

This application is a national stage of PCT Application No. PCT/US2020/042331, entitled "Bale Wrapping System", filed Jul. 16, 2020, which claims priority from and the benefit of U.S. Provisional Application Ser. No. 62/874,863, entitled "Bale Wrapping System," filed Jul. 16, 2019. Each of the foregoing application is hereby incorporated by reference in its entirety.

BACKGROUND

The present disclosure relates generally to a bale wrapping system.

Generally, baling implements (e.g., agricultural balers or packagers) are driven or towed through a field. The baling implements are utilized to harvest an agricultural product from the field and to form the agricultural product into bales (e.g., round bales). Certain baling implements include a belt configured to drive agricultural product to rotate within a bale chamber. The bale is formed within the belt by adding the agricultural product. A density of the agricultural product within the bale may be limited due to a lack of pressure on the agricultural product during and after bale formation.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a bale wrapping system includes a bale chamber configured to receive agricultural product and a belt configured to be disposed within the bale chamber. The belt is configured to be positioned between a bale wrap and an interior surface of the bale chamber while the belt is disposed within the bale chamber. Additionally, the belt is configured to support the bale wrap and to move into the bale chamber due to a weight of the agricultural product on the bale wrap. Further, the belt is configured to compact the agricultural product within the bale wrap, such that a bale of the agricultural product at least partially surrounded by the bale wrap is formed within the bale chamber.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
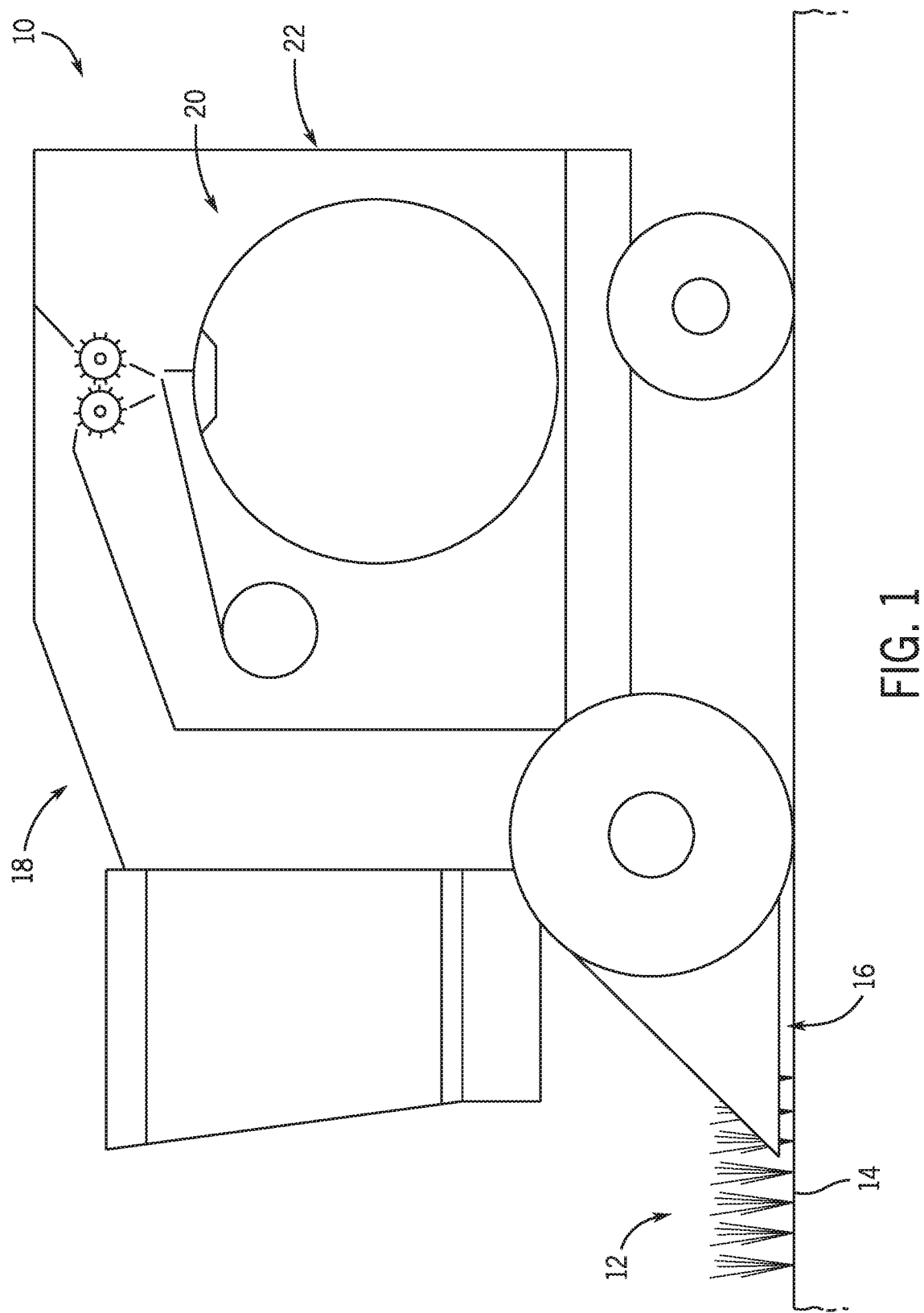
FIG. 1 is a schematic side view of an embodiment of an agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a bale wrapping system of an agricultural implement. Certain agricultural implements (e.g., harvesters) are configured to harvest an agricultural product (e.g., cotton and other agricultural products) and to form the agricultural product into a bale (e.g., a round bale). The bale wrapping system is configured to wrap the bale with a bale wrap to secure the agricultural product within the bale and to generally maintain a shape of the bale. In some embodiments, the bale wrapping system includes a bale chamber configured to receive the agricultural product, a bale wrap configured to be disposed within the bale chamber between the agricultural product and an interior surface of the bale chamber (e.g., such that the bale wrap receives the agricultural product), and a belt configured to be disposed between the bale wrap and the interior surface of the bale chamber and to compact the agricultural product within the bale wrap.

In certain embodiments, the bale wrapping system includes a bale wrap locking mechanism configured to secure an end of the bale wrap to the bale chamber (e.g., baling chamber) as the bale of agricultural product is formed. For example, the bale wrap locking mechanism may include hook(s) and/or a clamp configured to secure the end of the bale wrap to the bale chamber. In some embodiments, the bale wrapping system may include a bale securing mechanism configured to secure the bale wrap around the bale. For example, the bale securing mechanism may include an adhesive application mechanism and/or a sewing mechanism configured to couple a first portion of the bale wrap to a second portion of the bale wrap, which overlaps the first portion, to secure the bale wrap around the bale of agricultural product.

With the foregoing in mind, the present embodiments relating to bale wrapping systems may be utilized within any suitable agricultural implement. For example, FIG. 1 is a schematic side view of an embodiment of an agricultural implement 10 (e.g., a harvester). The agricultural implement 10 is configured to harvest agricultural product 12 (e.g., cotton and/or other suitable agricultural products) from a field 14 and to form the agricultural product 12 into bales and/or modules. In the illustrated embodiment, the agricultural implement 10 includes a header 16 (e.g., including drums, etc.) configured to harvest the agricultural product 12 from the field 14. Additionally, the agricultural implement 10 includes an air-assisted product transport system 18 configured to move the agricultural product 12 from the header 16 to a bale wrapping system 20 via an airflow. The bale wrapping system 20 is supported and/or mounted within or on the agricultural implement 10. The bale wrapping system 20 is configured to compress the agricultural product 12 into a bale. In the illustrated embodiment, the bale wrapping system 20 includes a bale chamber 22 configured to house the agricultural product 12 during formation of the bale (e.g., a baling chamber). As illustrated, the bale chamber 22 is round and is configured to form round bales. In other embodiments, the bale chamber may be square/rectangular and configured to form square bales/modules. In some embodiments, the bale chamber may be triangular or another suitable shape to form bales of the agricultural product having a corresponding shape. As described in greater detail below, the bale wrapping system 20 is configured to secure a bale wrap around the bale of agricultural product 12 to secure the agricultural product 12 within the bale and to generally maintain a shape of the bale.

Figure 2:
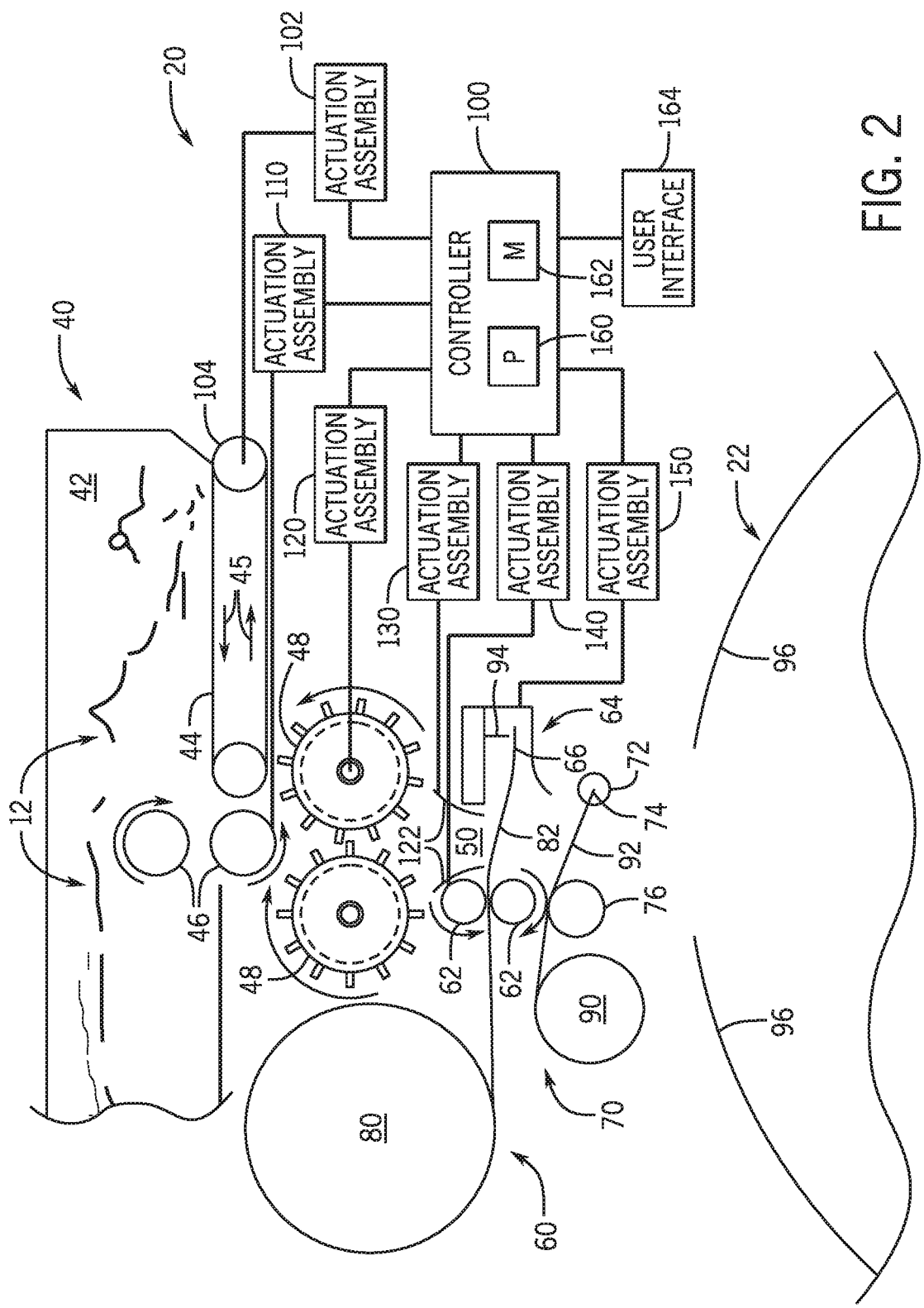
FIG. 2 is a schematic side view of an embodiment a bale wrapping system having an infeed system that may be employed in the agricultural implement of FIG. 1, in accordance with an aspect of the present disclosure.

FIG. 2 is a schematic side view of an embodiment of a bale wrapping system 20 having an infeed system 40 that may be employed in the agricultural implement of FIG. 1. The infeed system 40 is configured to receive the agricultural product 12 from the air-assisted product transport system in an accumulation area 42 of the infeed system 40. As illustrated, the infeed system 40 includes a conveyor belt 44 configured to rotate, as indicated by arrows 45, to convey the agricultural product 12 from the accumulation area 42 to leveling augers 46 of the infeed system 40. The conveyor belt 44 may remain stationary (e.g., not rotate) during an accumulation mode to enable the accumulation area 42 to accumulate the agricultural product 12. The leveling augers 46 are configured to receive the agricultural product 12 from the conveyor belt 44 and to generally level the agricultural product 12 within the accumulation area 42 (e.g., by rotating). The conveyor belt 44 and/or the leveling augers 46 are configured to convey the agricultural product 12 to feeder rollers 48 of the infeed system 40. The feeder rollers 48 are configured to convey the agricultural product 12 from the conveyor belt 44 and/or from the leveling augers 46 (e.g., the bottom leveling auger) toward/into a hopper 50 of the infeed system 40 disposed between the feeder rollers 48 and the bale chamber 22 of the bale wrapping system 20. The hopper 50 is configured to transition between an open position that facilitates flow of the agricultural product 12 into the bale chamber 22 and a closed position that blocks flow of the agricultural product 12 into the bale chamber 22. With the hopper 50 in the closed position, the rotation of the conveyor belt 44, the leveling augers 46, and the feeder rollers 48 are stopped, and the agricultural product 12 is stored in the accumulation area 42 for subsequent deposition into the bale chamber 22. In certain embodiments, with the hopper 50 in the closed position, the hopper 50 may store some of the agricultural product 12. With the hopper 50 in the open position, as illustrated, the conveyor belt 44, the leveling augers 46, and the feeder rollers 48 are driven to rotate, and the agricultural product 12 may flow through the hopper 50 and into the bale chamber 22. In certain embodiments, the bale wrapping system 20 may include a portion or all components of the illustrated infeed system 40. For example, the bale wrapping system 20 may include the accumulation area 42, the conveyor belt 44, the leveling augers 46, the feeder rollers 48, the hopper 50, or a combination thereof. In some embodiments, the agricultural implement may include an entirely different infeed system configured to feed the agricultural product toward the bale wrap and the bale chamber.

The bale wrapping system 20 includes a bale wrap 60 configured to wrap around the bale of agricultural product 12, bale wrap rollers 62 configured to feed/unroll the bale wrap 60 for subsequent wrapping around the bale, and a bale wrap locking mechanism 64 configured to secure an end 66 of the bale wrap 60 to the bale chamber 22 (e.g., the end 66 may be disposed within and secured by the bale wrap locking mechanism 64). The bale wrap 60 may include cotton (e.g., may be 100 percent cotton, 90 percent cotton, 80 percent cotton, etc.) and may be formed as a canvas, cloth, fabric, or a combination thereof. Additionally, the bale wrapping system 20 includes a belt 70 configured to compact the agricultural product 12 within the bale wrap 60, a belt locking mechanism 72 configured to secure an end 74 of the belt 70 to the bale chamber 22, and a belt roller 76 configured to facilitate movement of the belt 70. The belt 70 may be formed from rubber and/or other suitable materials. Initially, the bale wrap 60 is stored in a roll 80. The bale wrap rollers 62 are configured to drive a portion 82 of the bale wrap 60 toward the bale wrap locking mechanism 64. Additionally, the belt 70 is stored as a roll 90, and a portion 92 of the belt 70 extends from the roll 90 to the belt locking mechanism 72. In certain embodiments, the belt roller 76 may drive movement of the portion 92 of the belt 70 and rotation of the roll 90 such that the end 74 of the belt 70 moves toward the belt locking mechanism 72, thereby enabling the belt locking mechanism 72 to engage/secure the end 74. Additionally, the belt roller 76 may support the belt 70. In some embodiments, the belt 70 may be configured to retract toward and to wrap around the roll 90 (e.g., biased toward a rolled position).

In the illustrated embodiment, the bale wrap locking mechanism 64 includes one or more hooks 94 configured to secure the end 66 of the bale wrap 60 to the bale chamber 22. For example, the hooks 94 may extend through the bale wrap 60 (e.g., through the material of the bale wrap 60) to secure the end 66 of the bale wrap 60 to the bale chamber 22. In certain embodiments, the hook 94 and/or the bale wrap locking mechanism 64 may include a clamping mechanism configured to secure the end 66 of the bale wrap 60. Movement of the agricultural product 12 into the bale chamber 22 may drive the portion 82 of the bale wrap 60 downwardly into the bale chamber 22, thereby unrolling the bale wrap 60 from the roll 80. In other embodiments, the bale wrap locking mechanism may include a clamp, a clip, a hook and loop fastening system, another suitable mechanism configured to secure the bale wrap to the bale chamber, or a combination thereof, in addition to or in place of the hooks of the illustrated bale wrap locking mechanism.

During operation, the infeed system 40 is configured to flow/move the agricultural product 12 from the accumulation area 42 into the bale chamber 22. As the agricultural product 12 moves downwardly through the hopper 50, the agricultural product 12 engages the bale wrap 60 (e.g., the portion 82 of the bale wrap 60) and drives the bale wrap 60 downwardly toward the portion 92 of the belt 70 and the bale chamber 22. As the bale wrap 60 is driven downwardly, the end 66 of the bale wrap 60 remains connected to the bale wrap locking mechanism 64. As the bale wrap 60 is driven downwardly by the agricultural product 12, the bale wrap 60 contacts the belt 70 (e.g., the portion 92 of the belt 70) and drives the belt 70 downwardly into the bale chamber 22. As the belt 70 is driven downwardly, the end 74 of the belt 70 remains connected to the belt locking mechanism 72. Accordingly, flow/movement of the agricultural product 12 into the bale wrapping system 20 drives the bale wrap 60 and the belt 70 downwardly into the bale chamber 22. The infeed system 40 is configured to continue feeding the agricultural product 12 into the bale chamber 22, such that the bale wrap 60 is forced between the agricultural product 12 and the belt 70, and the belt 70 is forced between the bale wrap 60 and an interior surface 96 of the bale chamber 22.

A controller 100 of the bale wrapping system 20 is configured to control operation of the bale wrapping system 20. For example, the controller 100 may control a rate of rotation of the conveyor belt 44 to control an infeed rate of the agricultural product 12 into the leveling augers 46 and/or into the feeder rollers 48. To control the rate of rotation of the conveyor belt 44, the controller 100 may output an output signal to an actuation assembly 102 coupled to one or both wheels 104, which are engaged with the conveyor belt 44. The output signal may be indicative of instructions to adjust the belt speed of the conveyor belt 44. The controller 100 may be communicatively coupled to the actuation assembly 102 via wired and/or wireless communication mechanism(s). In response to receiving the output signal, the actuation assembly 102 may adjust the rotation rate of one or both wheels 104 to adjust the belt speed of the conveyor belt 44. For example, the actuation assembly 102 may include actuator(s) and/or motor(s) configured to drive rotation of the wheel(s) 104, thereby driving rotation of the conveyor belt 44.

Additionally, the controller 100 may control a rate of rotation of one or both leveling augers 46 to control an infeed rate of the agricultural product 12 into the feeder rollers 48. To control the rate of rotation of the leveling auger(s) 46, the controller 100 may output an output signal to an actuation assembly 110 coupled to the leveling auger(s) 46. The output signal may be indicative of instructions to adjust the rate of rotation of the leveling auger(s) 46. The controller 100 may be communicatively coupled to the actuation assembly 110 via wired and/or wireless communication mechanism(s). In response to receiving the output signal, the actuation assembly 110 may adjust the rotation rate of the leveling auger(s) 46. For example, the actuation assembly 110 may include actuator(s) and/or motor(s) configured to drive rotation of the leveling auger(s) 46.

Additionally, the controller 100 may control a rate of rotation of one or both feeder rollers 48 to control an infeed rate of the agricultural product 12 into the hopper 50. To control the rate of rotation of the feeder roller(s) 48, the controller 100 may output an output signal to an actuation assembly 120 coupled to the feeder roller(s) 48. The output signal may be indicative of instructions to adjust the rate of rotation of the feeder roller(s) 48. The controller 100 may be communicatively coupled to the actuation assembly 120 via wired and/or wireless communication mechanism(s). In response to receiving the output signal, the actuation assembly 120 may adjust the rotation rate of the feeder roller(s) 48. For example, the actuation assembly 120 may include actuator(s) and/or motor(s) configured to drive rotation of the feeder roller(s) 48.

The controller 100 may control a position/orientation of one or both panels 122 of the hopper 50 to control the flow of the agricultural product 12 through the hopper 50. To control the position of the panel(s) 122, the controller 100 may output an output signal to an actuation assembly 130 coupled to the panel(s) 122 of the hopper 50. The output signal may be indicative of instructions to adjust the position of the panel(s) 122. The controller 100 may be communicatively coupled to the actuation assembly 130 via wired and/or wireless communication mechanism(s). In response to receiving the output signal, the actuation assembly 130 may adjust the position of one or both panels 122 (e.g., between the open position of FIG. 2 and a closed position). For example, the actuation assembly 130 may include actuator(s) and/or motor(s) configured to drive movement of the panel(s) 122 between the open position and the closed position. In the illustrated open position, the agricultural product 12 may flow through the hopper 50 toward the bale chamber 22. As described in greater detail below, in a closed position, the agricultural product 12 may accumulate within the accumulation area 42. In certain embodiments, the controller of the bale wrapping system may not control the wheels coupled to the conveyor belt, the leveling augers, the feeder rollers, the panels of the hopper, or a combination thereof.

The controller 100 may control a rate of rotation of one or both bale wrap rollers 62 to control movement of the end 66 of the bale wrap 60 toward the bale wrap locking mechanism 64. To control the rate of rotation of the bale wrap roller(s) 62, the controller 100 may output an output signal to an actuation assembly 140 coupled to the bale wrap roller(s) 62. The output signal may be indicative of instructions to adjust the rate of rotation of the bale wrap roller(s) 62. The controller 100 may be communicatively coupled to the actuation assembly 140 via wired and/or wireless communication mechanism(s). In response to receiving the output signal, the actuation assembly 140 may adjust the rotation rate of the bale wrap roller(s) 62. For example, the actuation assembly 140 may include actuator(s) and/or motor(s) configured to drive rotation of the bale wrap roller(s) 62. Once the bale wrap locking mechanism 64 engages the end 66 of the bale wrap 60, the controller 100 may output an output signal to the actuation assembly 140 indicative of instructions to stop driving rotation of the bale wrap rollers 62. In certain embodiments, the controller 100 may control the feed rate of the bale wrap 60 (e.g., via the bale wrap roller(s) 62) based on a tension of the belt 70 (e.g., based on a torque on the roll 90 of the belt 70).

The controller 100 may control a state of the bale wrap locking mechanism 64 between a locked state and the illustrated unlocked state. To control the state of the bale wrap locking mechanism 64, the controller 100 may output an output signal to an actuation assembly 150 coupled to the bale wrap locking mechanism 64. The output signal may be indicative of instructions to adjust the position of the hook(s) 94. For example, the controller 100 may be communicatively coupled to the actuation assembly 150 via wired and/or wireless communication mechanism(s). In response to receiving the output signal, the actuation assembly 150 may adjust the state of the bale wrap locking mechanism 64 between the illustrated unlocked state and the closed position (e.g., the locked state). For example, the actuation assembly 150 may include actuator(s) and/or motor(s) configured to drive movement of the hook(s) 94 downwardly from the illustrated unlocked state to the locked state, in which the hook(s) 94 are engaged with the bale wrap 60. As described in greater detail below, in the locked state, the bale wrap locking mechanism 64 is configured to secure the end 66 of the bale wrap 60 to the bale chamber 22, thereby enabling the agricultural product 12 to drive the bale wrap 60 downwardly into the bale chamber 22 (e.g., drive the portion 82 of the bale wrap 60 into the bale chamber 22).

As illustrated, the controller 100 of the bale wrapping system 20 includes a processor 160 and a memory 162. The processor 160 (e.g., a microprocessor) may be used to execute software, such as software stored in the memory 162 for controlling certain component(s) of the bale wrapping system 20 (e.g., for controlling a rotation rate of the conveyor belt 44, a position of the hopper 50, etc.). Moreover, the processor 160 may include multiple microprocessors, one or more "general-purpose" microprocessors, one or more special-purpose microprocessors, and/or one or more application specific integrated circuits (ASICS), or some combination thereof. For example, the processor 160 may include one or more reduced instruction set (RISC) or complex instruction set (CISC) processors.

The memory 162 may include a volatile memory, such as random access memory (RAM), and/or a nonvolatile memory, such as read-only memory (ROM). The memory 162 may store a variety of information and may be used for various purposes. For example, the memory 162 may store processor-executable instructions (e.g., firmware or software) for the processor 160 to execute, such as instructions for controlling certain component(s) of the bale wrapping system 20. In certain embodiments, the controller 100 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling certain component(s) of the bale wrapping system 20), and any other suitable data. The processor 160 and/or the memory 162, and/or an additional processor and/or memory device, may be located in any suitable portion of the system. For example, a memory device for storing instructions (e.g., software or firmware for controlling component(s) of the bale wrapping system 20) may be located in or associated with the bale wrapping system 20.

Additionally, the bale wrapping system 20 includes a user interface 164 communicatively coupled to the controller 100. The user interface 164 may be configured to inform an operator of the rotation rate of the wheels 104, the rotation rate of the leveling augers 46, the rotation rate of the feeder rollers 48, the rotation rate of the bale wrap rollers 62, the position of the panel(s) 122 of the hopper 50 (e.g., open or closed), the state of the bale wrap locking mechanism 64 (e.g., locked or unlocked), or a combination thereof. Additionally, the user interface 164 may be configured to enable operator interactions with the bale wrapping system 20, such as control of the conveyor belt 44, the leveling augers 46, the feeder rollers 48, the hopper 50, the bale wrap rollers 62, the bale wrap locking mechanism 64, or a combination thereof. For example, the user interface 164 may include a display and/or other user interaction devices (e.g., buttons) configured to enable operator interactions.

Figure 3:
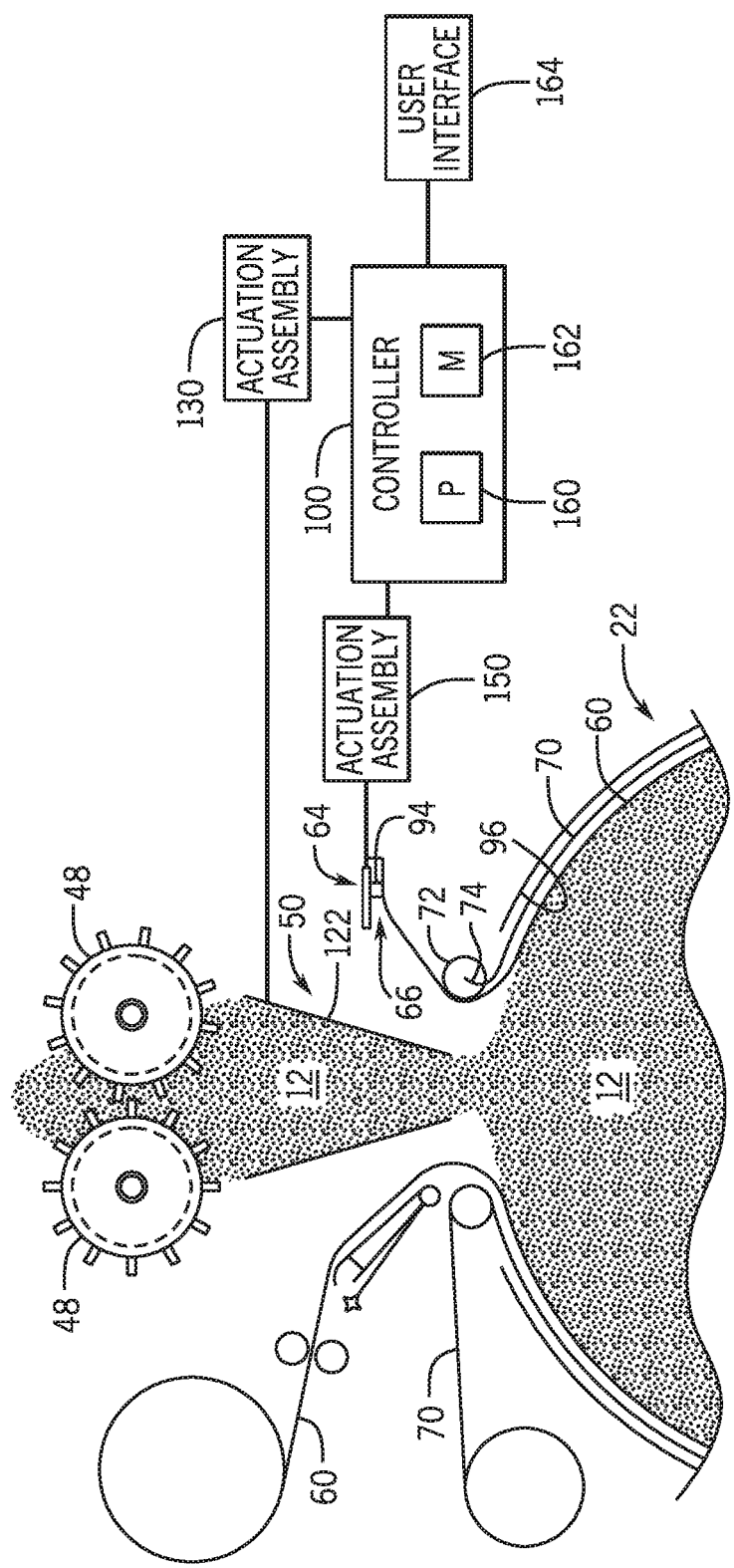
FIG. 3 is a schematic side view of the bale wrapping system of FIG. 2, in accordance with an aspect of the present disclosure.

FIG. 3 is a schematic side view of the bale wrapping system 20 of FIG. 2. As illustrated, the panels 122 of the hopper 50 are in the open position, such that the agricultural product 12 may flow from/through the hopper 50. Additionally, the bale wrap locking mechanism 64 is in a locked state with the end 66 of the bale wrap 60 secured by the hooks 94 of the bale wrap locking mechanism 64 to the bale chamber 22. As illustrated, the agricultural product 12 is disposed within the bale chamber 22, and the agricultural product 12 forces the bale wrap 60 and the belt 70 outwardly toward the interior surface 96 of the bale chamber 22. The bale wrap 60 is disposed between and in contact with the agricultural product 12 and the belt 70, and the belt 70 is disposed between and in contact with the bale wrap 60 and the interior surface 96 of the bale chamber 22. In certain embodiments, the controller 100 may determine that a new bale is ready for formation (e.g., in response to receiving a signal indicative of ejection of a previously formed bale, etc.) and/or may receive an input signal indicative of instructions (e.g., from a main implement controller, from the user interface, etc.) to form a new bale of the agricultural product 12. In response, the controller 100 may output an output signal to the actuation assembly 150 indicative of instructions transition the locking mechanism 64 to the locked state, thereby securing the end 66 of the bale wrap 60 to the bale chamber 22. In addition, the controller 100 may output an output signal to the actuation assembly 130 indicative of instructions to open the panels 122 of the hopper 50, thereby enabling the agricultural product 12 to flow into the bale chamber 22. As the agricultural product 12 fills the bale wrap 60, the belt 70 remains generally taught around the bale wrap 60, thereby compressing the agricultural product 12 within the bale wrap 60 (e.g., due to the belt 70 being biased toward the rolled position).

Figure 4:
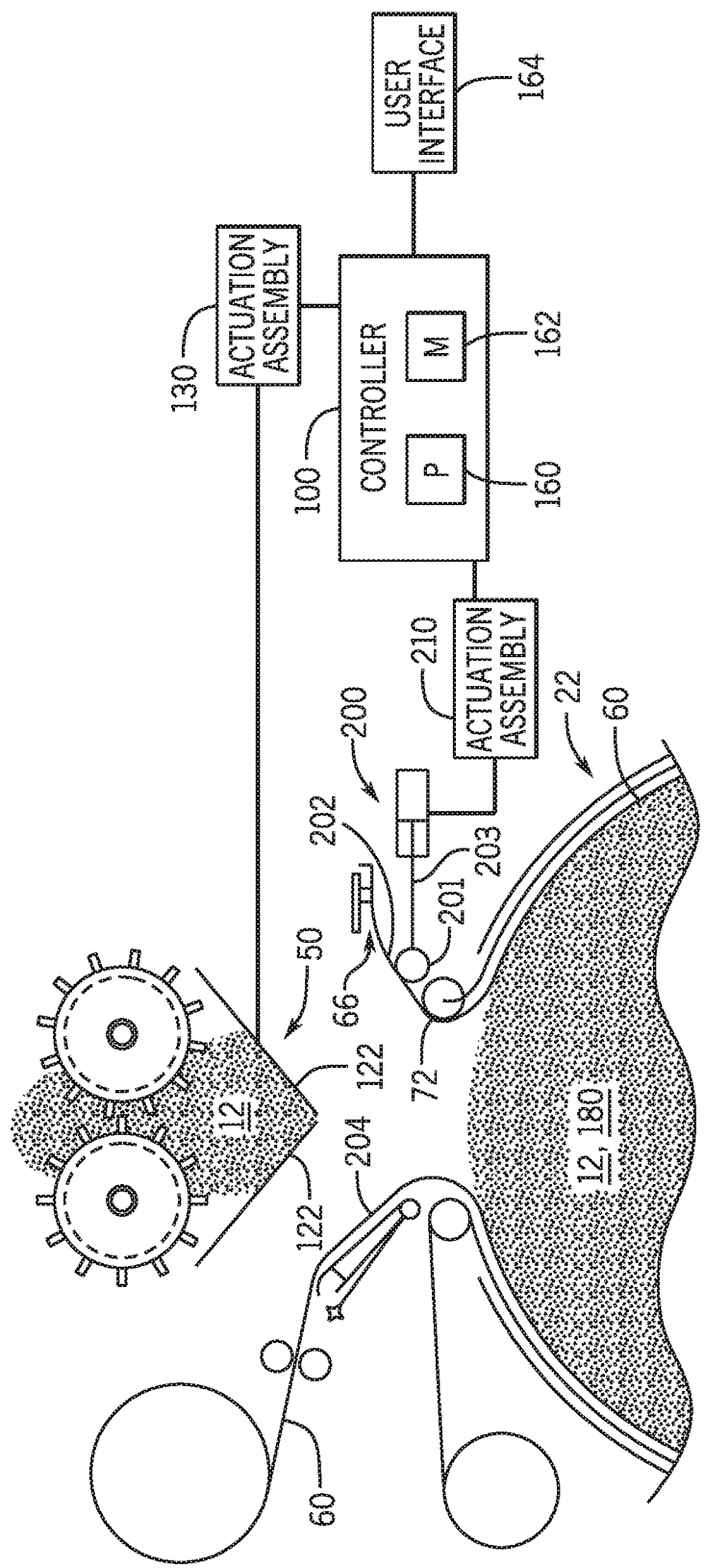
FIG. 4 is a schematic side view of the bale wrapping system of FIG. 2, in accordance with an aspect of the present disclosure.

FIG. 4 is a schematic side view of the bale wrapping system 20 of FIG. 2. As illustrated, the panels 122 of the hopper 50 are in a closed position, such that the agricultural product 12 is blocked from flowing through the hopper 50. In certain embodiments, the controller 100 may determine that a bale 180 of the agricultural product 12 is fully formed and/or may receive an input signal (e.g., from a sensor, from another controller, etc.) indicating that the bale 180 is fully formed. In response, the controller 100 may output an output signal to the actuation assembly 130 indicative of instructions to close the panels 122 of the hopper 50 (e.g., to move to the illustrated closed position), thereby preventing the agricultural product 12 from flowing into the bale chamber 22. In certain embodiments, the controller 100 may control the state of the hopper 50 (e.g., close or open the hopper 50) based on a tension of the belt 70 (e.g., based on a torque on the roll 90 of the belt 70).

In the illustrated embodiment, the bale wrapping system 20 includes a bale securing mechanism 200 configured to apply an adhesive (e.g., glue) to the bale wrap 60 (e.g., via an adhesive application mechanism) to secure the bale wrap 60 around the bale 180. For example, the bale securing mechanism 200 includes an adhesive applicator 201 configured to flow (e.g., spray) an adhesive onto a first portion 202 of the bale wrap 60. Additionally, the bale securing mechanism 200 includes a folding mechanism 203 configured to fold the first portion 202 of the bale wrap 60 downwardly to contact a second portion 204 of the bale wrap 60 (e.g., that does not have the adhesive), thereby bonding the first portion 202 to the second portion 204. The controller 100 may control application of the adhesive and folding of the bale wrap 60 by the bale securing mechanism 200. For example, the controller 100 may output an output signal to an actuation assembly 210 of the bale securing mechanism 200 indicative of instructions to apply the adhesive to the bale wrap 60 via the adhesive applicator 201 (e.g., the controller 100 may be communicatively coupled to the actuation assembly 210 via wired and/or wireless communication mechanism(s)). In response to receiving the output signal, the actuation assembly 210 may cause the adhesive applicator 201 of the bale securing mechanism 200 to apply the adhesive to the bale wrap 60. In certain embodiments, the controller 100 may be directly communicatively coupled to the adhesive applicator 201. Additionally, the controller may output an output signal to the actuation assembly 210 indicative of instructions to fold the portion 202 of the bale wrap 60 over onto the bale 180. In response, the actuation assembly 210 may cause the folding mechanism 203 to fold the portion 202 of the bale wrap 60. For example, the actuation assembly 210 may include actuator(s) and/or motor(s) configured to drive movement of the bale securing mechanism 200 toward the portion 202 of the bale wrap 60, such that the bale securing mechanism 200 applies the adhesive to and folds the portion 202 of the bale wrap 60.

Figure 5:
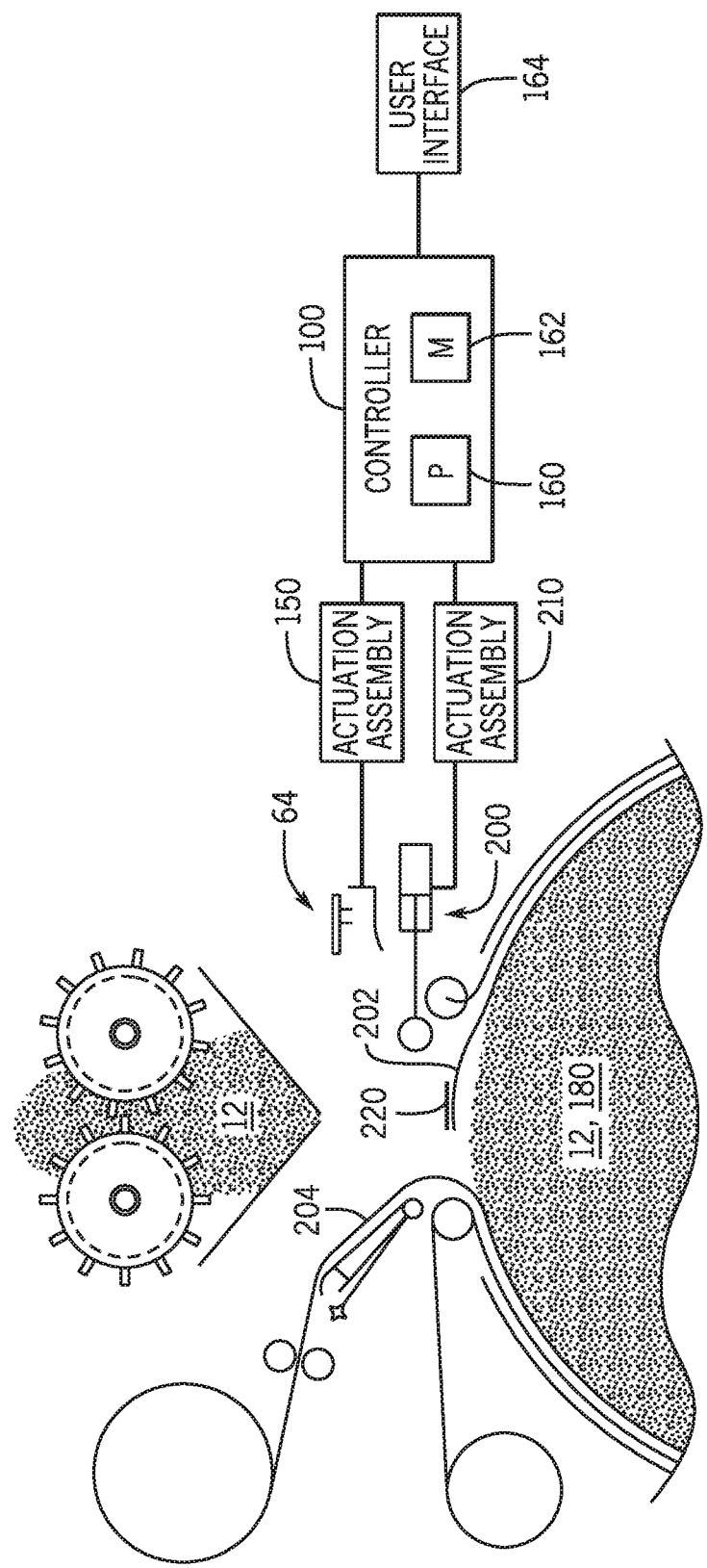
FIG. 5 is a schematic side view of the bale wrapping system of FIG. 2, in accordance with an aspect of the present disclosure.

FIG. 5 is a schematic side view of the bale wrapping system 20 of FIG. 2. In certain embodiments, the controller 100 may determine that the adhesive 220 is applied to the first portion 202 of the bale wrap 60 and/or receives an input signal indicating that the adhesive 220 is applied to the first portion 202 of the bale wrap 60. In response, the controller 100 may output an output signal to the actuation assembly 150 indicative of instructions to transition the locking mechanism 64 to the unlocked state, thereby releasing the end 66 of the bale wrap 60. As illustrated, the end 66 of the bale wrap 60 is released from the locking mechanism 64, such that the portion 202 of the bale wrap 60 having the adhesive 220 is disposed on top of the bale 180. The portion 202 of the bale wrap 60 disposed between the bale 180 and the adhesive 220, such that the adhesive 220 does not contact the bale 180.

Figure 6:
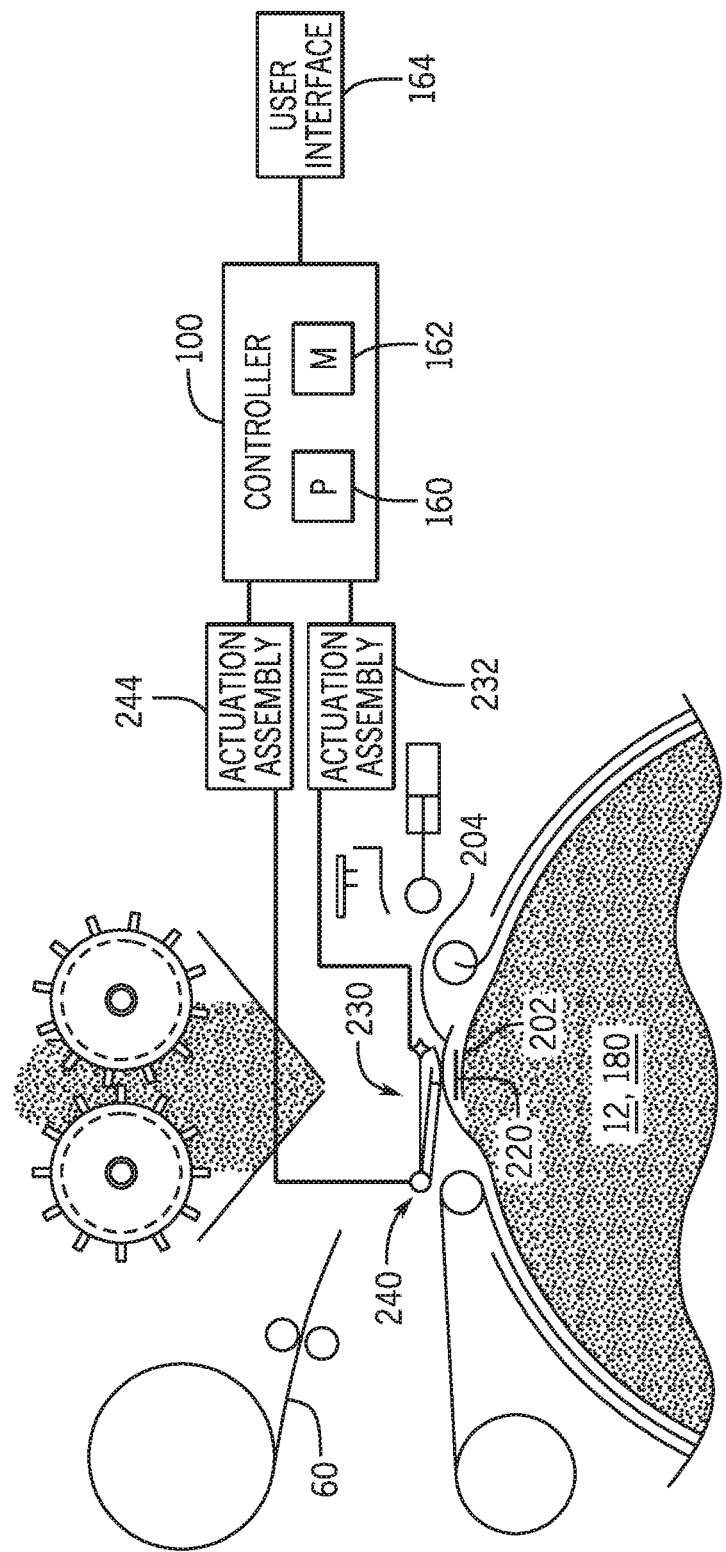
FIG. 6 is a schematic side view of the bale wrapping system of FIG. 2, in accordance with an aspect of the present disclosure.

FIG. 6 is a schematic side view of the bale wrapping system 20 of FIG. 2. The bale wrapping system 20 includes a cutting mechanism 230 configured to cut the bale wrap 60. The bale wrapping system 20 also includes a folding mechanism 240 configured to fold the second portion 204 of the bale wrap 60 over the first portion 202, thereby securing the bale wrap 60 around the bale 180. The cutting mechanism 230 is configured to cut the bale wrap 60 after the first portion 202 of the bale wrap 60, which has the adhesive 220, is folded over onto the bale 180. For example, the cutting mechanism 230 may include a blade, a saw, and/or other suitable mechanism(s) configured to cut the bale wrap 60. The controller 100 may control cutting of the bale wrap 60 by controlling the cutting mechanism 230. For example, the controller 100 may output an output signal to an actuation assembly 232 coupled to the cutting mechanism 230 indicative of instructions to cut the bale wrap 60. The controller 100 may be communicatively coupled to the actuation assembly 232 via wired and/or wireless communication mechanism(s). In response to receiving the output signal, the actuation assembly 232 may drive the cutting mechanism 230 to cut the bale wrap 60. For example, the actuation assembly 232 may include actuator(s) and/or motor(s) configured to drive movement of the cutting mechanism 230.

The folding mechanism 240 is configured to fold the second portion 204 of the bale wrap 60 onto the adhesive 220 after the cutting mechanism 230 cuts the bale wrap 60, such that the second portion 204 overlaps the first portion 202. For example, an actuation assembly 244 of the bale wrapping system 20 may drive rotation of the folding mechanism 240. The controller 100 may control folding of the bale wrap 60 by controlling the actuation assembly 244 coupled to the folding mechanism 240. For example, the controller 100 may output an output signal to the actuation assembly 244, which is coupled to the folding mechanism 240, indicative of instructions to fold the second portion 204 of the bale wrap 60 onto the first portion 202 of the bale wrap 60. The controller 100 may be communicatively coupled to the actuation assembly 244 via wired and/or wireless communication mechanism(s). In response to receiving the output signal, the actuation assembly 244 may drive the folding mechanism 240 to rotate, thereby causing the second portion 204 of the bale wrap 60 to fold onto the adhesive 220 on the first portion 202 of the bale wrap 60. As a result, the portions 202 and 204 of the bale wrap 60 may be bonded to one another by the adhesive 220, thereby securing the bale wrap 60 around the bale 180. For example, the actuation assembly 244 may include actuator(s) and/or motor(s) configured to drive movement of the folding mechanism 240. In certain embodiments, the folding mechanism 240 may continue to press the second portion 204 toward the first portion 202 for an extended period of time (e.g., one second, two seconds, five seconds, thirty seconds, one minute, two minutes, etc.) to facilitate bonding of the portions 202 and 204 to one another via the adhesive 220. The controller 100 may control the amount of time that the folding mechanism 240 pushes the second portion 204 onto the first portion 202. After the portions 202 and 204 of the bale wrap 60 are bonded to one another, the folding mechanism 240 may return to an initial position to facilitate formation of a subsequent bale (e.g., the controller 100 may output an output signal to the actuation assembly 244 indicative of instructions to rotate the folding mechanism 240 to the initial position). In certain embodiments, the folding mechanism may be biased against the bale wrap such that the folding mechanism folds the portion of the bale wrap onto the adhesive as soon as the bale wrap is cut (e.g., without instructions/control from the controller). After folding the bale wrap, the controller may return the folding mechanism back to the original, biased position via the actuation assembly.

Figure 7:
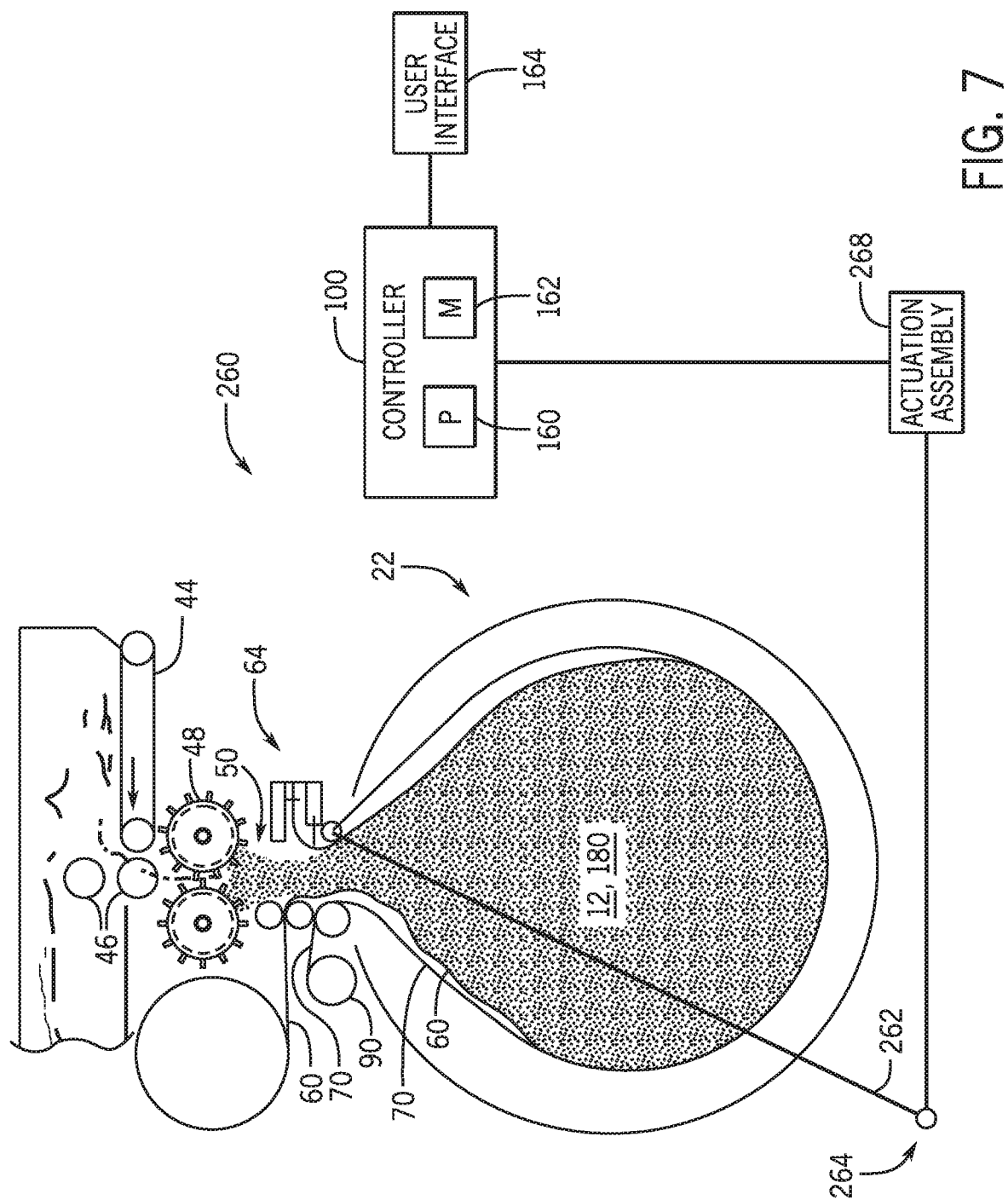
FIG. 7 is a schematic side view of another embodiment of a bale wrapping system that may be employed in the agricultural implement of FIG. 1, in accordance with an aspect of the present disclosure.

FIG. 7 is a schematic side view of another embodiment of a bale wrapping system 260 that may be employed in the agricultural implement of FIG. 1. The bale wrapping system 260 includes the bale chamber 22, the conveyor belt 44, the leveling augers 46, the feeder rollers 48, the hopper 50, the bale wrap 60, the bale wrap locking mechanism 64, and the belt 70, among other components. As illustrated, only a portion of the bale chamber 22 is filled with the agricultural product 12. As the bale wrap 60 within the bale chamber 22 is filled with the agricultural product 12, the belt 70 resists expansion of the bale wrap 60, thereby compressing the agricultural product 12 within the bale wrap 60. During formation of the bale, the bale wrap 60 is generally taught against the agricultural product 12, and the belt 70 is generally taught against the bale wrap 60.

As illustrated, the bale wrapping system 260 includes a belt arm 262 configured to pivot about a first end 264 of the belt arm 262. Additionally, the belt arm 262 is coupled to the belt locking mechanism 72 at a second end 266 of the belt arm 262 opposite the first end 264. During filling of the bale wrap 60 with the agricultural product 12, the belt arm 262 and the belt locking mechanism 72 are configured to remain in the illustrated positions. After formation of the bale within the bale chamber 22, the belt arm 262 is configured to rotate about the end 264, such that the belt locking mechanism 72 moves downwardly and the belt 70 is no longer in tension, thereby releasing the bale from the bale chamber 22. The controller 100 may control a position of the belt arm 262. To control the belt arm 262, the controller 100 may output an output signal to an actuation assembly 268 coupled to the belt arm 262 and configured to drive rotation of the belt arm 262. The output signal may be indicative of instructions to rotate and/or adjust a position of the belt arm 262. The controller 100 may be communicatively coupled to the actuation assembly 268 via wired and/or wireless communication mechanism(s). In response to receiving the output signal, the actuation assembly 268 may adjust the position of the belt arm 262. For example, the actuation assembly 268 may include actuator(s) and/or motor(s) configured to drive rotation of the belt arm 262.

Figure 8:
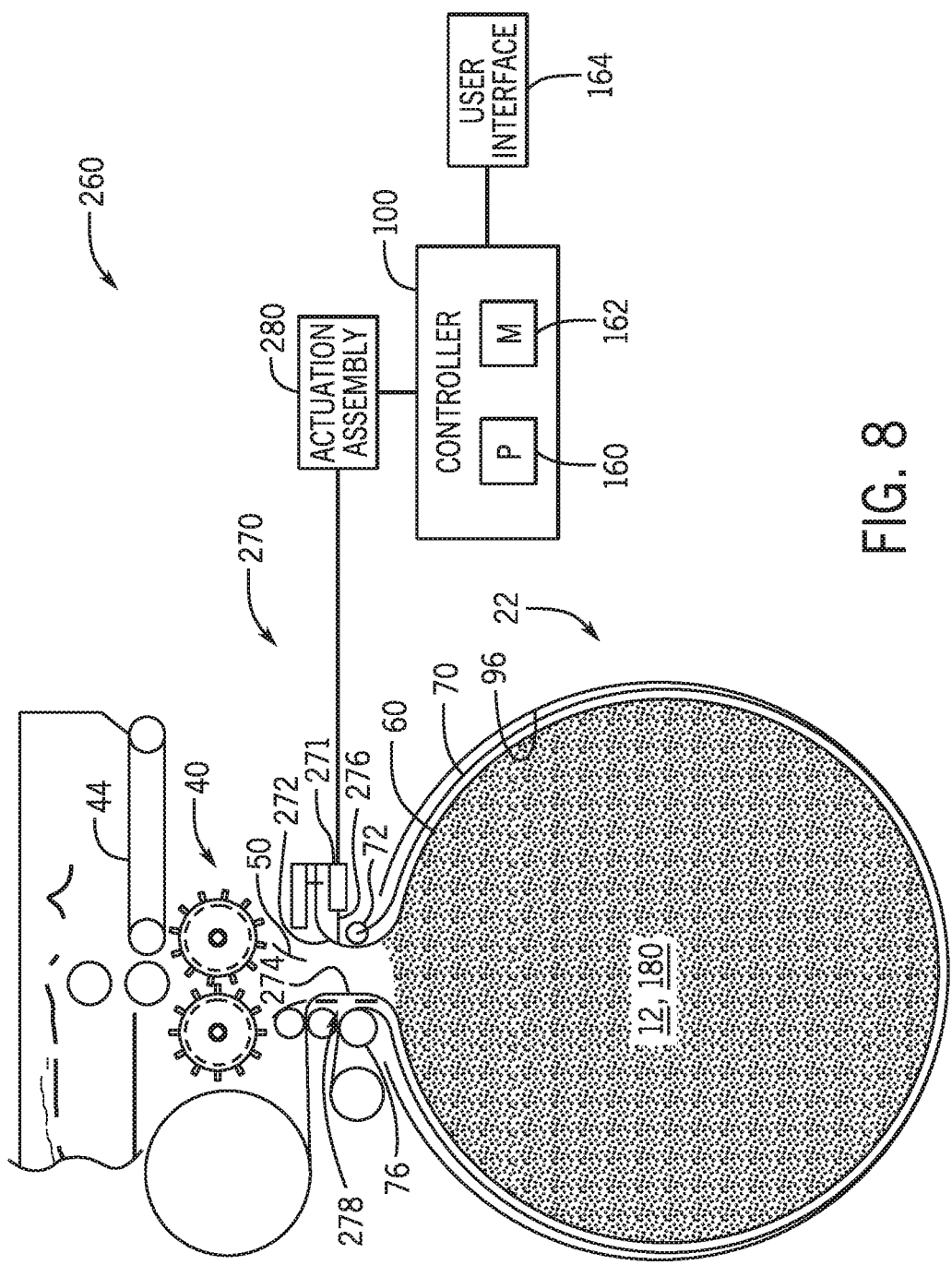
FIG. 8 is a schematic side view of the bale wrapping system of FIG. 7, in accordance with an aspect of the present disclosure.

FIG. 8 is a schematic side view of the bale wrapping system 260 of FIG. 7. As illustrated, the bale wrap 60 within the bale chamber 22 is filled with the agricultural product 12, and the bale 180 of the agricultural product 12 is fully formed within the bale chamber 22. The bale wrap 60 is disposed between the bale 180 and the belt 70, and the belt 70 is disposed between the bale wrap 60 and the interior surface 96 of the bale chamber 22. After filling the bale chamber 22 with the agricultural product 12, the infeed system 40 may stop feeding the agricultural product 12 into the bale chamber 22, such as by stopping rotation of the conveyor belt 44 and/or closing the hopper 50. In certain embodiments, the controller 100 may control the belt locking mechanism 72 based on the torque on the belt roller 76. For example, as the bale wrap 60 is filled with the agricultural product 12 within the bale chamber 22, the tension on the belt 70 increases and the torque on the belt roller 76 increases.

In the illustrated embodiment, the bale wrapping system 260 includes a bale securing mechanism 270 configured to sew portions of the bale wrap 60 to one another to secure the bale wrap 60 around the bale 180 (e.g., a bale sewing assembly). For example, the bale securing mechanism 270 includes a movement mechanism 271 configured to pull a first portion 272 of the bale wrap 60 a second portion 274 of the bale wrap 60 toward one another. For example, the bale securing mechanism 270 includes a sewing mechanism 276 (e.g., needle(s)) and a perforated plate 278. The movement mechanism 271 may move the perforated plate 276 to pull the portions 272 and 274 toward one another. Additionally, the movement mechanism 271 may move the sewing mechanism 276 through the perforated plate 276 and through the portions 272 and 274 to sew the portions 272 and 274 to one another. Further, the controller 100 may control sewing of the bale wrap 60 by the bale securing mechanism 270. For example, the controller 100 may output a first output signal to an actuation assembly 280 coupled to the bale securing mechanism 270 indicative of instructions to pull the portions 272 and 274 of the bale wrap 60 toward one another and may output a second output signal to the actuation assembly 280 indicative of instructions to sew the portions 272 and 274 to one another. The controller 100 may be communicatively coupled to the actuation assembly 280 via wired and/or wireless communication mechanism(s). In response to receiving the first output signal, the actuation assembly 280 may drive the movement mechanism 271 to pull the portions 272 and 274 of the bale wrap 60 against one another (e.g., by moving the perforated plate 276). In response to receiving the second output signal, the actuation assembly 280 may drive the movement mechanism 271 to move the sewing mechanism 276 through the perforated plate 278 to sew the portions 272 and 274 to one another (e.g., with a thread running through the sewing mechanism 276). For example, the actuation assembly 280 may include actuator(s) and/or motor(s) configured to drive/actuate the movement mechanism 271 and the sewing mechanism 276.

Figure 9:
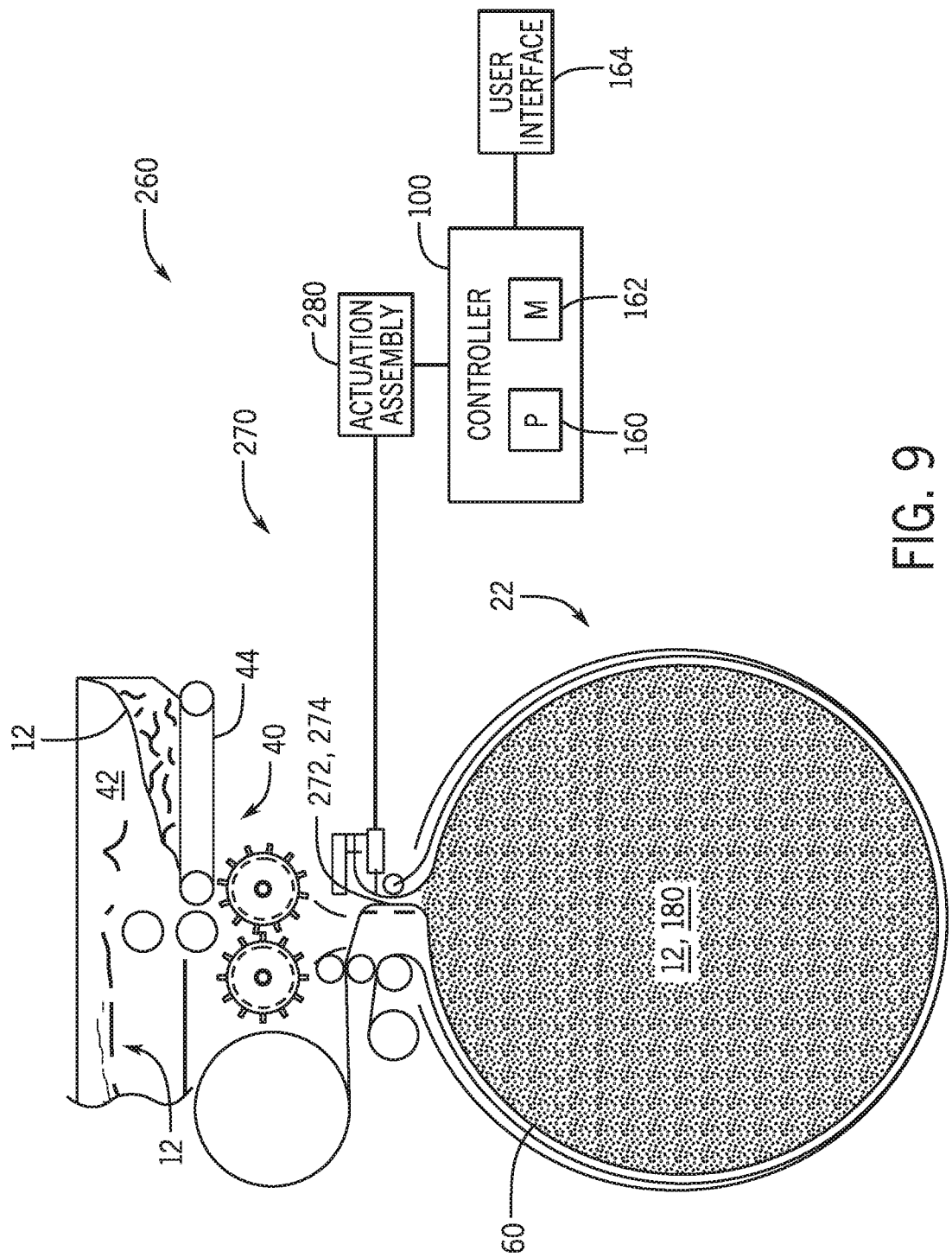
FIG. 9 is a schematic side view of the bale wrapping system of FIG. 7, in accordance with an aspect of the present disclosure.

FIG. 9 is a schematic side view of the bale wrapping system 260 of FIG. 7. As illustrated, the portions 272 and 274 of the bale wrap 60 are sewn to one another by the bale securing mechanism 270, thereby securing the bale wrap 60 around the bale 180 of the agricultural product 12. While the bale wrap 60 is being sewn by the bale securing mechanism 270 of the bale wrapping system 260, the agricultural product 12 accumulates in the accumulation area 42, as illustrated. As previously discussed, the controller 100 may stop the flow of the agricultural product 12 from the infeed system 40 (e.g., such as by stopping operation of the conveyor belt 44). As such, the agricultural implement may continue harvesting the agricultural product 12 for subsequent baling while the bale wrap 60 is secured around the bale 180.

Figure 10:
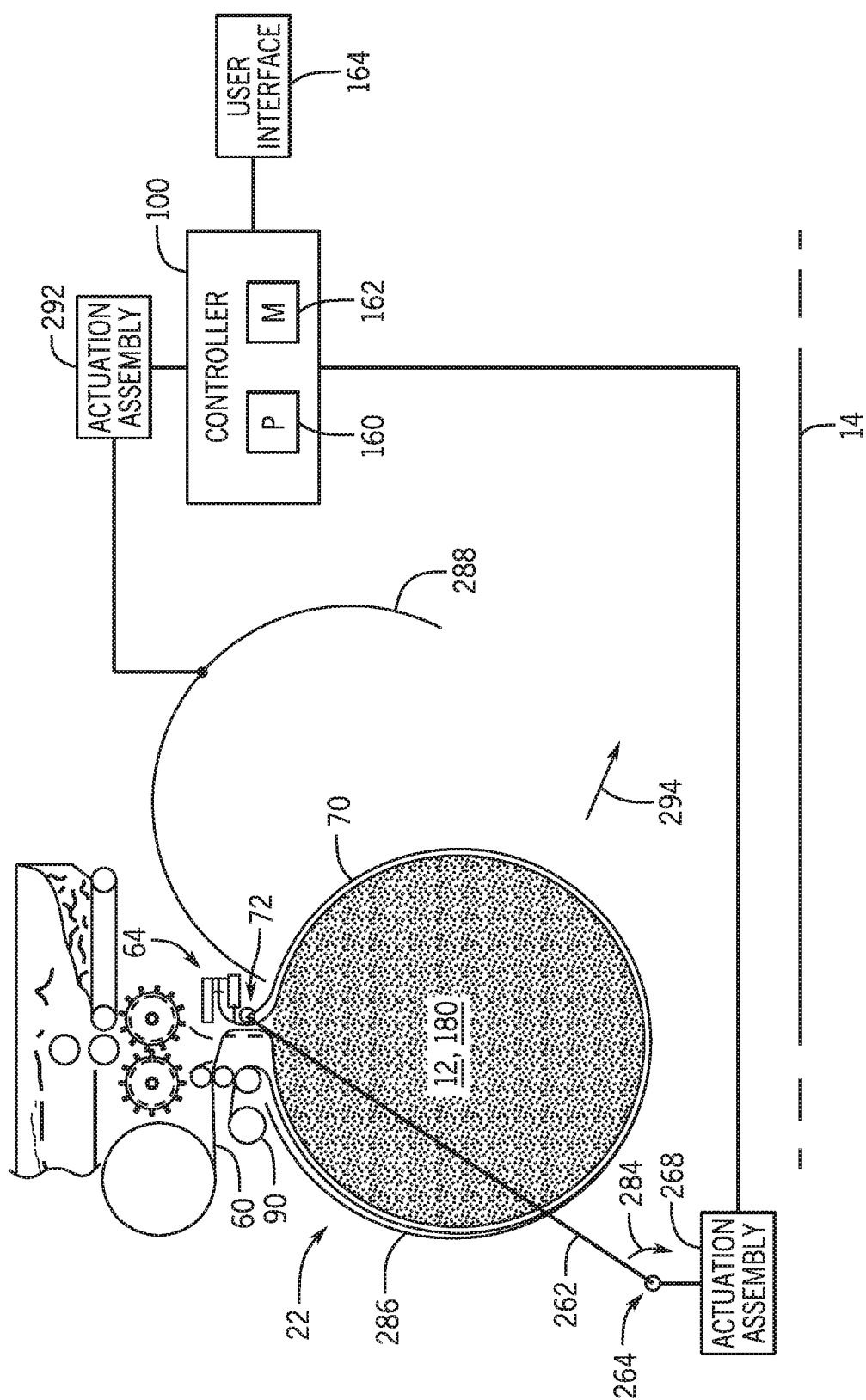
FIG. 10 is a schematic side view of the bale wrapping system of FIG. 7, in accordance with an aspect of the present disclosure.

FIG. 10 is a schematic side view of the bale wrapping system 260 of FIG. 7. As illustrated, the bale chamber 22 of the bale wrapping system 260 includes a first portion 286 (e.g., main body) and a second portion 288 (e.g., door), which are configured to selectively enclose the bale 180. After securing the bale wrap 60 around the bale 180, the controller 100 may control ejection of the bale 180 from the bale chamber 22. For example, the controller 100 may output an output signal to an actuation assembly 292 coupled to the second portion 288 of the bale chamber 22. The output signal may be indicative of instructions to move the second portion 288 away (e.g., upwardly) from the first portion 286. The controller 100 may be communicatively coupled to the actuation assembly 292 via wired and/or wireless communication mechanism(s). In response to receiving the output signal, the actuation assembly 292 may move (e.g., lift) the second portion 288 (e.g., upwardly) away from the first portion 286. For example, the actuation assembly 292 may include actuator(s) and/or motor(s) configured to drive movement of the second portion 288.

The bale wrapping system 260 may rotate the belt arm 262, as indicated by arrow 284, such that the belt 70 is no longer wrapped around the bale 180. The controller 100 may control the belt arm 262 based on the torque on the belt roller 76 (e.g., by comparing the torque to a threshold value). For example, as the second portion 288 moves away from the first portion 286, the controller 100 may output the output signal to the actuation assembly 268 coupled to the belt arm 262 and configured to drive rotation of the belt arm 262. The output signal may be indicative of instructions to rotate and/or adjust a position of the belt arm 262. After the second portion 288 rotates upwardly and the belt arm 262 rotates downwardly, the bale 180 is ejected from the bale chamber 22. As the bale 180 is ejected, the agricultural product 12 accumulates in the accumulation area 42. As such, the agricultural implement may continue harvesting the agricultural product 12 for subsequent baling while the bale 180 is ejected from the bale chamber 22. After the bale 180 is ejected, the second portion 288 may rotate back and be coupled to the first portion 286. Additionally, the belt arm 262 may return to the illustrated position, and the belt 70 may extend between the roll 90 and the belt locking mechanism 72 (e.g., the belt 70 may be taught between the roll 90 and the belt locking mechanism 72). The bale wrap 60 may extend across to the bale wrap locking mechanism 64, thereby enabling the bale wrapping system 260 to form the next bale 180.

Figure 11:
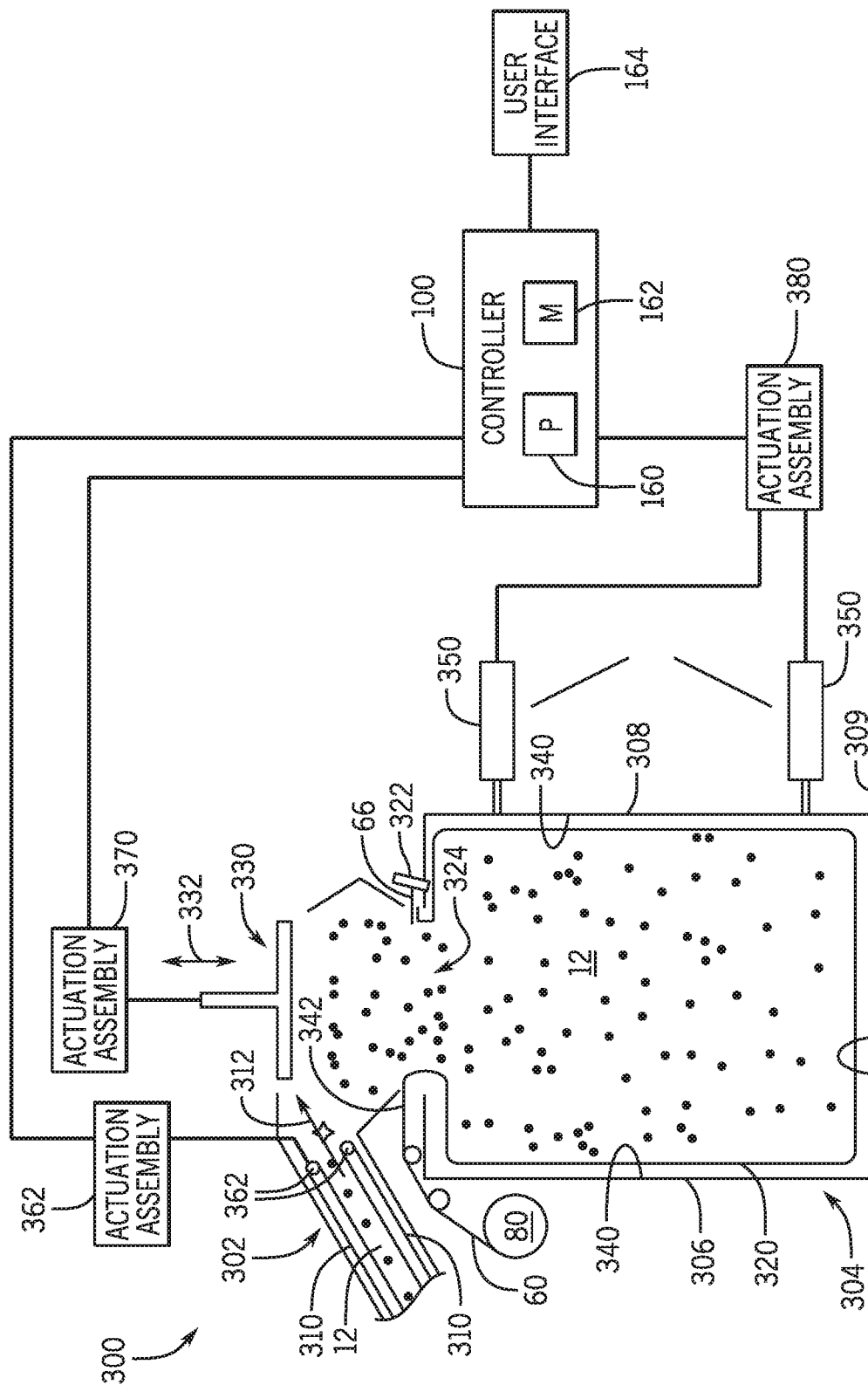
FIG. 11 is a schematic side view of another embodiment of a bale wrapping system that may be employed in the agricultural implement of FIG. 1, in accordance with an aspect of the present disclosure.

FIG. 11 is a schematic side view of another embodiment of a bale wrapping system 300 that may be employed in the agricultural implement of FIG. 1. The bale wrapping system 300 includes an infeed system 302 configured to flow/move the agricultural product 12 toward a bale chamber 304 configured to receive the agricultural product 12. As illustrated, the bale chamber 304 has a generally rectangular cross-section and is configured to form square bales and/or modules of the agricultural product 12. For example, the bale chamber 304 includes a first portion 306 and a second portion 308 slidably coupled to one another. Additionally, the bale wrapping system 300 includes an evening plate 309 configured to slidably support the second portion 308 of the bale chamber 304. In other embodiments, the bale chamber 304 may have other suitable cross-sectional shapes and be configured to form bales/modules of corresponding shapes, such as round bales/modules. The infeed system 302 includes conveyor belts 310 disposed opposite one another along the infeed system 302. The conveyor belts 310 are configured to rotate to drive movement of the agricultural product 12 toward the bale chamber 304, as indicated by arrow 312.

As illustrated, the bale wrapping system 300 includes the bale wrap 60. The bale wrap 60 extends from the roll 80 and includes a portion 320 disposed within the bale chamber 304. Additionally, the bale wrap 60 extends to a bale wrap locking mechanism 322 configured to secure the end 66 of the bale wrap 60 to the bale chamber 304. For example, the bale wrap locking mechanism 322 may include hook(s), clamp(s), other suitable mechanism(s), or a combination thereof, configured to secure the end 66 of the bale wrap 60 to the bale chamber 304. In certain embodiments, the portion 320 of the bale wrap 60 may initially extend across an inlet 324 of the bale chamber 304. The infeed system 302 may drive the agricultural product 12 onto the portion 320 at and/or adjacent to the inlet 324 to drive the portion 320 into the bale chamber 304.

The bale wrapping system 300 includes a packing mechanism 330 configured to drive the agricultural product 12 above the bale chamber 304 downwardly into the bale chamber 304 and to compact the agricultural product 12 within the bale chamber 304. For example, the packing mechanism 330 may include a packing plate configured to be driven toward and away from the bale chamber 304, as indicated by arrows 332, by an actuator assembly.

As the agricultural product 12 flows onto/into the portion 320 of the bale wrap 60 within the bale chamber 304 (e.g., due to the weight of the agricultural product 12 and/or movement of the packing mechanism 330), the agricultural product 12 may cause the bale wrap 60 to expand to contact an inner perimeter 340 of the bale chamber 304 (e.g., the inner perimeter 340 formed by the first portion 306 and the second portion 308 of the bale chamber 304).

In other embodiments, the bale wrapping system may include a track system configured to run the bale wrap along the inner perimeter of the bale chamber for subsequent filling with the agricultural product. For example, the track system may feed/run the bale wrap from the bale wrap roll, through a track along the inner perimeter of the bale chamber, and to the bale wrap locking mechanism. Thereafter, the bale wrap within the bale chamber may be filled with the agricultural product. In certain embodiments, the controller of the bale wrapping system may control the track system (e.g., may the movement/feeding of the bale wrap along the inner perimeter of the bale chamber).

After filling the portion 320 of the bale wrap 60 disposed within the bale chamber 304 with the agricultural product 12, the bale wrap 60 is cut at a portion 342 of the bale wrap 60, such as via the cutting mechanism described above. Additionally, the bale wrapping system 300 may be configured to secure the ends of the bale wrap 60 to one another, such as by one or more of the bale securing mechanisms described above.

The bale wrapping system 300 includes compression actuators 350 coupled to the second portion 308 of the bale chamber 304. The compression actuators 350 are configured to drive the second portion 308 of the bale chamber 304 toward the first portion 306 of the bale chamber 304 (e.g., before or after the bale wrap 60 is secured around the agricultural product 12), thereby compressing the agricultural product 12 within the bale chamber 304 into a bale. For example, the compression actuators 350 may include hydraulic cylinders, pneumatic cylinders, or both. While the illustrated embodiment includes two compression actuators 350, other embodiments may include more or fewer compression actuators (e.g., one compression actuator, three compression actuators, four compression actuators, etc.).

The controller 100 is configured to control operation of the bale wrapping system 300. For example, the controller 100 may control a rate of rotation of the conveyor belts 310 to control an infeed rate of the agricultural product 12 into the bale chamber 304. To control the rate of rotation of the conveyor belts 310, the controller 100 may output an output signal to an actuation assembly 360 coupled to wheels 362 coupled to and configured to drive rotation of the conveyor belts 310. The output signal may be indicative of instructions to adjust the belt speed of the conveyor belts 310. The controller 100 may be communicatively coupled to the actuation assembly 360 via wired and/or wireless communication mechanism(s). In response to receiving the output signal, the actuation assembly 360 may adjust the rotation rate of the wheels 362 to adjust the belt speed of the conveyor belts 310. For example, the actuation assembly 360 may include actuator(s) and/or motor(s) configured to drive rotation of the wheels 362, thereby driving rotation of the conveyor belts 310.

Additionally, the controller 100 may control a force applied by the packing mechanism 330 to the agricultural product 12. To control the pressure applied by the packing mechanism 330, the controller 100 may output an output signal to an actuation assembly 370 coupled to the packing mechanism 330. The output signal may be indicative of instructions to adjust the pressure applied by the packing mechanism 330. The controller 100 may be communicatively coupled to the actuation assembly 370 via wired and/or wireless communication mechanism(s). In response to receiving the output signal, the actuation assembly 370 may adjust the pressure applied by the packing mechanism 330 to the agricultural product 12. For example, the actuation assembly 370 may include actuator(s) and/or motor(s) configured to drive movement of the packing mechanism 330.

Additionally, the controller 100 may control a force applied by the compression actuators 350 to the second portion 308 of the bale chamber 304. To control the pressure applied by the compression actuators 350, the controller 100 may output an output signal to an actuation assembly 380 coupled to the compression actuators 350. The output signal may be indicative of instructions to adjust the pressure applied by the compression actuators 350. The controller 100 may be communicatively coupled to the actuation assembly 380 via wired and/or wireless communication mechanism(s). In response to receiving the output signal, the actuation assembly 380 may adjust the pressure applied by the compression actuators 350 to the second portion 308 of the bale chamber 304. For example, the actuation assembly 380 may include actuator(s) and/or motor(s) configured to drive movement of the compression actuators 350.

Figure 12:
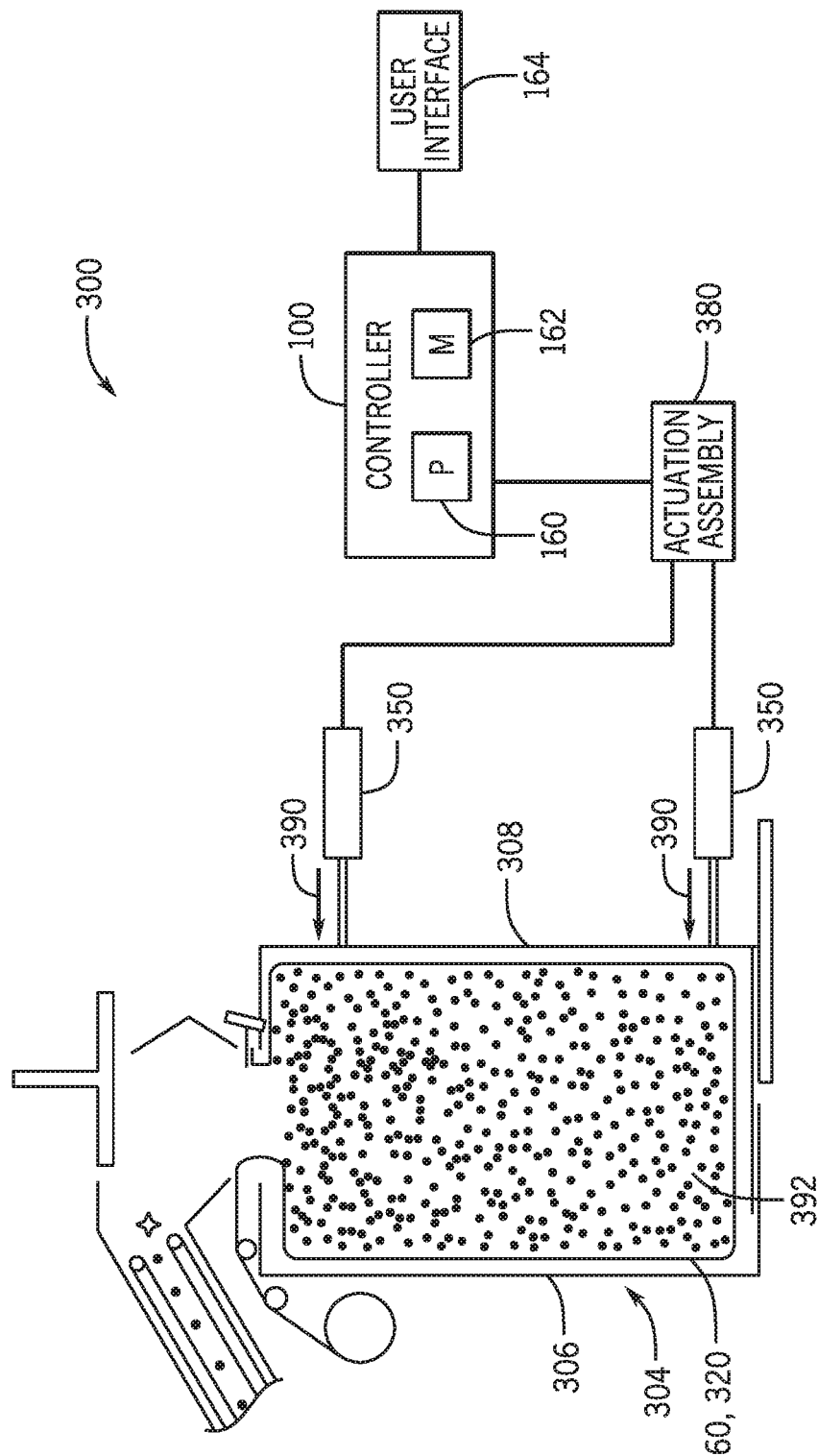
FIG. 12 is schematic a side view of the bale wrapping system of FIG. 11, in accordance with an aspect of the present disclosure.

FIG. 12 is a schematic side view of the bale wrapping system 300 of FIG. 11. In certain embodiments, the controller 100 may determine that the agricultural product 12 is ready to be compressed into the bale 392. In response, the controller 100 may output the output signal to the actuation assembly 380 indicative of instructions to adjust the force applied by the compression actuators 350. For example, as illustrated, the second portion 308 of the bale chamber 304 is moved toward the first portion 306 of the bale chamber 304 (e.g., as indicated by arrows 390) by the compression actuators 350, thereby compressing the agricultural product 12 into a bale 392. Additionally, the portion 320 of the bale wrap 60 is wrapped around the bale 392 within the bale chamber 304.

Figure 13:
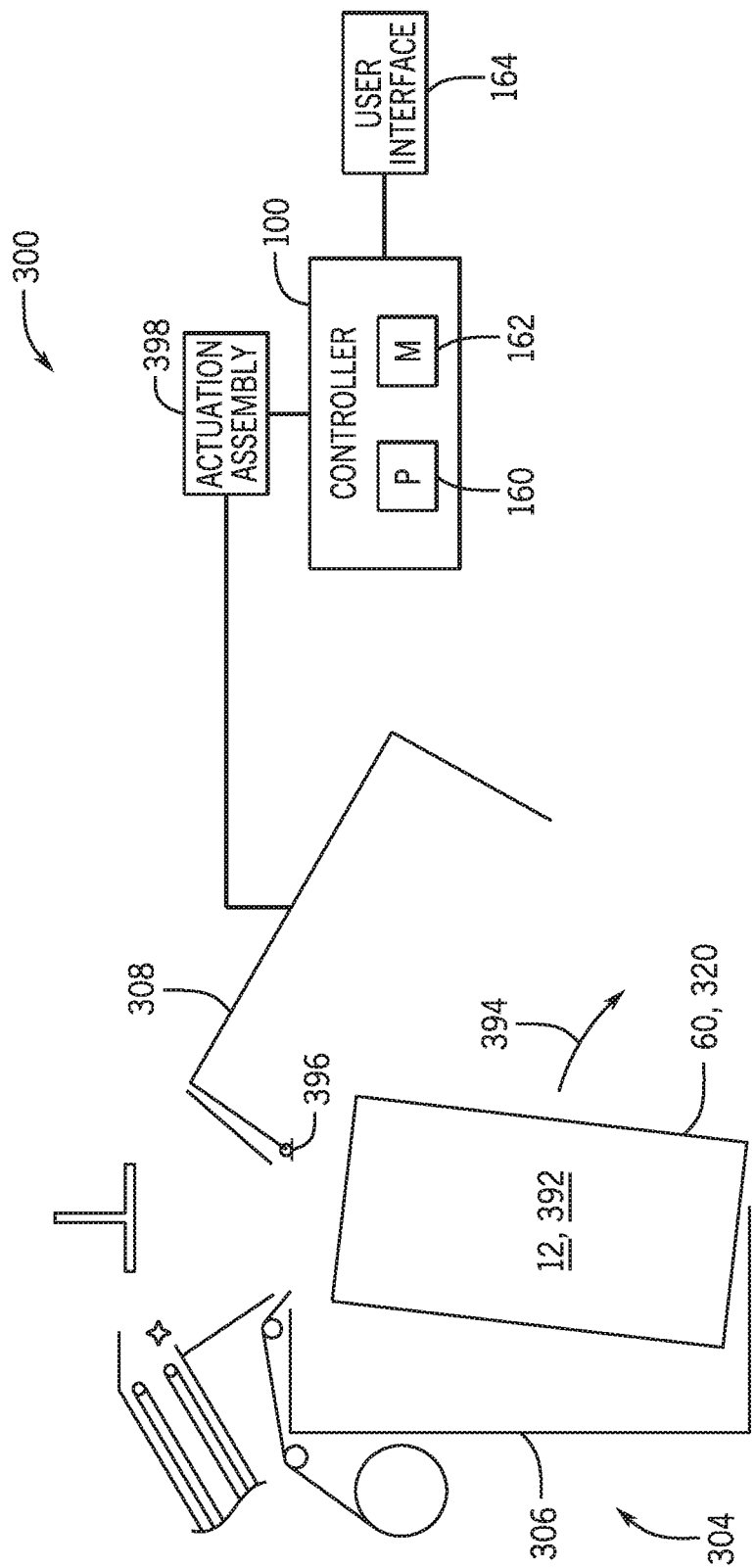
FIG. 13 is a schematic side view of the bale wrapping system of FIG. 11, in accordance with an aspect of the present disclosure.

FIG. 13 is a schematic side view of the bale wrapping system 300 of FIG. 11. In certain embodiments, the controller 100 may output an output signal to the compression actuators coupled to the second portion 308 of the bale chamber 304 indicative of instructions to terminate the force applied to the second portion 308. In response, the compression actuators may terminate the force applied to the second portion 308 of the bale chamber 304. As illustrated, the bale chamber 304 is in an open configuration (e.g., the first portion 306 of the bale chamber 304 is separated and apart from the second portion 308 of the bale chamber 304), thereby enabling the bale 392 of the agricultural product 12 to move out of the bale chamber 304, as indicated by arrow 394. In the illustrated embodiment, to separate the first portion 306 and the second portion 308, the second portion 308 may pivot about a pivot point 396. For example, the controller 100 may control the pivoting motion of the second portion 308 of the bale chamber 304. To control the pivoting motion of the second portion 308, the controller 100 may output an output signal to an actuation assembly 398 coupled to the second portion 308 of the bale chamber 304 and configured to rotate the second portion 308 upwardly about the pivot point 396. The output signal may be indicative of instructions to rotate the second portion 308 of the bale chamber 304 upwardly away from the first portion 306 of the bale chamber 304. The controller 100 may be communicatively coupled to the actuation assembly 398 via wired and/or wireless communication mechanism(s). In response to receiving the output signal, the actuation assembly 398 may rotate the second portion 308 of the bale chamber 304 upwardly away from the first portion 306 of the bale chamber 304. For example, the actuation assembly 398 may include actuator(s) and/or motor(s) configured to rotate the second portion 308 of the bale chamber 304. In other embodiments, the actuation assembly may move the first portion away from the second portion via linear movement.

The embodiments of a bale wrapping system described herein may facilitate wrapping of bales of agricultural product. The bale wrapping system is configured to wrap the bale with a bale wrap to secure the agricultural product within the bale and to generally maintain a shape of the bale. The bale wrap may be formed of natural materials, such as cotton. In some embodiments, the bale wrapping system includes a bale chamber configured to receive the agricultural product, the bale wrap configured to be disposed within the bale chamber between the agricultural product and an interior surface of the bale chamber (e.g., such that the bale wrap receives the agricultural product), and a belt configured to be disposed between the bale wrap and the interior surface of the bale chamber and to compact the agricultural product within the bale wrap. The ability to compact the bales of agricultural product may increase a storage capacity of the bales and/or may increase a shelf life of the bales in storage.

In certain embodiments, the bale wrapping system includes a bale wrap locking mechanism configured to secure an end of the bale wrap to the bale chamber (e.g., baling chamber) as the bale of agricultural product is formed. For example, the bale wrap locking mechanism may include hook(s) and/or a clamp configured to secure the end of the bale wrap to the bale chamber. In some embodiments, the bale wrapping system may include a bale securing mechanism configured to secure the bale wrap around the bale. For example, the bale securing mechanism may include an adhesive application mechanism and/or a sewing mechanism configured to couple a first portion of the bale wrap to a second portion of the bale wrap, which overlaps the first portion, to secure the bale wrap around the bale of agricultural product.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An infeed system for an agricultural implement, comprising:
   an accumulation area configured to receive agricultural product;
   a plurality of feeder rollers configured to receive the agricultural product from the accumulation area and to direct the agricultural product toward a bale chamber; and
   a hopper disposed between the plurality of feeder rollers and the bale chamber, wherein the hopper comprises a pair of panels configured to transition between an open position that facilitates flow of the agricultural product into the bale chamber and a closed position that blocks flow of the agricultural product into the bale chamber.

2. The infeed system of claim 1, comprising a conveyor belt configured to convey the agricultural product toward the plurality of feeder rollers.

3. The infeed system of claim 2, wherein the conveyor belt is positioned at a base of the accumulation area.

4. The infeed system of claim 1, comprising a plurality of augers configured to convey the agricultural product toward the plurality of feeder rollers.

5. The infeed system of claim 1, comprising:
a conveyor belt configured to convey the agricultural product toward the plurality of feeder rollers; and
a plurality of augers configured to receive the agricultural product from the conveyor belt, to level the agricultural product within the accumulation area, and to convey the agricultural product toward the plurality of feeder rollers.

6. The infeed system of claim 1, wherein the accumulation area is configured to accumulate the agricultural product while the pair of panels of the hopper is in the closed position.

7. The infeed system of claim 1, wherein the accumulation area is configured to receive the agricultural product from an air-assisted product transportation system.

8. An infeed system for an agricultural implement, comprising:
an accumulation area configured to receive agricultural product;
a plurality of feeder rollers configured to receive the agricultural product from the accumulation area and to direct the agricultural product toward a bale chamber;
a feeder roller actuation assembly coupled to the plurality of feeder rollers and configured to control a rotation rate of the plurality of feeder rollers;
a hopper disposed between the plurality of feeder rollers and the bale chamber, wherein the hopper comprises a pair of panels configured to transition between an open position that facilitates flow of the agricultural product into the bale chamber and a closed position that blocks flow of the agricultural product into the bale chamber; and
a hopper actuation assembly coupled to the pair of panels and configured to transition the pair of panels between the open position and the closed position.

9. The infeed system of claim 8, comprising:
a conveyor belt configured to convey the agricultural product toward the plurality of feeder rollers, wherein the conveyor belt is disposed about a pair of wheels; and
a conveyor belt actuation assembly coupled to at least one wheel of the pair of wheels and configured to control a speed of the conveyor belt.

10. The infeed system of claim 9, wherein the conveyor belt is positioned at a base of the accumulation area.

11. The infeed system of claim 8, comprising:
a plurality of augers configured to convey the agricultural product toward the plurality of feeder rollers; and
an auger actuation assembly coupled to the plurality of augers and configured to control a rotation rate of the plurality of augers.

12. The infeed system of claim 8, comprising:
a conveyor belt configured to convey the agricultural product toward the plurality of feeder rollers, wherein the conveyor belt is disposed about a pair of wheels;
a conveyor belt actuation assembly coupled to at least one wheel of the pair of wheels and configured to control a speed of the conveyor belt;
a plurality of augers configured to receive the agricultural product from the conveyor belt, to level the agricultural product within the accumulation area, and to convey the agricultural product toward the plurality of feeder rollers; and
an auger actuation assembly coupled to the plurality of augers and configured to control a rotation rate of the plurality of augers.

13. The infeed system of claim 8, wherein the accumulation area is configured to accumulate the agricultural product while the pair of panels of the hopper is in the closed position.

14. The infeed system of claim 8, wherein the accumulation area is configured to receive the agricultural product from an air-assisted product transportation system.

15. An infeed system for an agricultural implement, comprising:
an accumulation area configured to receive agricultural product;
a plurality of feeder rollers configured to receive the agricultural product from the accumulation area and to direct the agricultural product toward a bale chamber;
a hopper disposed between the plurality of feeder rollers and the bale chamber, wherein the hopper comprises a pair of panels configured to transition between an open position that facilitates flow of the agricultural product into the bale chamber and a closed position that blocks flow of the agricultural product into the bale chamber; and
a controller configured to control a rotation rate of the plurality of feeder rollers and to control a position of the pair of panels of the hopper.

16. The infeed system of claim 15, comprising a feeder roller actuation assembly coupled to the plurality of feeder rollers and configured to control the rotation rate of the plurality of feeder rollers, wherein the controller is communicatively coupled to the feeder roller actuation assembly.

17. The infeed system of claim 15, comprising a hopper actuation assembly coupled to the pair of panels and configured to transition the pair of panels between the open position and the closed position, wherein the controller is communicatively coupled to the hopper actuation assembly.

18. The infeed system of claim 15, comprising:
a conveyor belt configured to convey the agricultural product toward the plurality of feeder rollers, wherein the conveyor belt is disposed about a pair of wheels; and
a conveyor belt actuation assembly coupled to at least one wheel of the pair of wheels and configured to control a speed of the conveyor belt, wherein the controller is communicatively coupled to the conveyor belt actuation assembly, and the controller is configured to control the speed of the conveyor belt.

19. The infeed system of claim 15, comprising:
a plurality of augers configured to convey the agricultural product toward the plurality of feeder rollers; and
an auger actuation assembly coupled to the plurality of augers and configured to control a rotation rate of the plurality of augers, wherein the controller is communicatively coupled to the auger actuation assembly, and the controller is configured to control the rotation rate of the plurality of augers.

20. The infeed system of claim 15, wherein the controller is configured to terminate rotation of the plurality of feeder rollers while the pair of panels is in the closed position.

* * * * *